(12) United States Patent
Lin et al.

(10) Patent No.: US 8,202,568 B2
(45) Date of Patent: Jun. 19, 2012

(54) METHOD FOR MAKING A CONDUCTIVE FILM OF CARBON NANOTUBES

(75) Inventors: Kuan-Jiuh Lin, Taichung (TW); Jun-Wei Su, Chiayi (TW); Ying-Chen Hsu, Changhua (TW)

(73) Assignee: Ipcooler Technology Inc., South District, Taichung (TW)

( * ) Notice: Subject to any disclaimer, the term of this patent is extended or adjusted under 35 U.S.C. 154(b) by 373 days.

(21) Appl. No.: 12/579,919

(22) Filed: Oct. 15, 2009

(65) Prior Publication Data
US 2010/0159127 A1    Jun. 24, 2010

(30) Foreign Application Priority Data
Dec. 23, 2008 (TW) ............... 97150219 A
Dec. 23, 2008 (TW) ............... 97150221 A

(51) Int. Cl.
*B05D 1/00* (2006.01)
*B05D 1/36* (2006.01)
*B05D 3/12* (2006.01)
*B05D 5/12* (2006.01)

(52) U.S. Cl. ........ 427/110; 427/108; 427/122; 427/240; 427/370; 427/425

(58) Field of Classification Search ............ 427/122, 427/240, 425, 370, 110, 108
See application file for complete search history.

(56) References Cited

U.S. PATENT DOCUMENTS

| | | | |
|---|---|---|---|
| 4,996,080 A * | 2/1991 | Daraktchiev | 427/600 |
| 6,835,591 B2 * | 12/2004 | Rueckes et al. | 438/99 |
| 7,375,369 B2 * | 5/2008 | Sen et al. | 257/40 |
| 2007/0215841 A1 * | 9/2007 | Ford et al. | 252/503 |

* cited by examiner

Primary Examiner — Kirsten Jolley
(74) Attorney, Agent, or Firm — Choate, Hall & Stewart LLP

(57) ABSTRACT

A method for making a conductive film of carbon nanotubes includes the steps of: a) preparing a carbon nanotube solution having a viscosity ranging from 1 to 50 c.p. at room temperature and containing a plurality of multi-walled carbon nanotubes; b) atomizing the carbon nanotube solution to form a plurality of atomized particles including the carbon nanotubes; c) providing a carrier gas to carry the atomized particles to a substrate disposed on a spin coating equipment; and d) spin coating the atomized particles on the substrate to form a conductive film of carbon nanotubes on a surface of the substrate.

19 Claims, 14 Drawing Sheets

METHOD FOR MAKING A CONDUCTIVE FILM OF CARBON NANOTUBES

CROSS-REFERENCE TO RELATED APPLICATION

This application claims priority of Taiwanese Application No. 097150219, filed on Dec. 23, 2008, and priority of Taiwanese Application No. 097150221, filed on Dec. 23, 2008, both of which are incorporated herein by reference in their entirety.

BACKGROUND OF THE INVENTION

1. Field of the Invention

The invention relates to a method for making a conductive film, more particularly to a method for making a conductive film of carbon nanotubes 2. Description of the Related Art In view of the wide application of a liquid crystal displayer, the development of a transparent conductive material is always a popular research subject. The transparent conductive film which can be applied in the displayer and the touch panel should have the following characteristics: 1) Both of the light transmittance and the conductivity thereof in the visible light range should be high; 2) A film having a smooth surface can be made thereby and a plasma processing environment can be sustained; 3) It can be easily etched so as to form a predetermined pattern; 4) It can be homogenized in a large area; 5) the production cost thereof is low; and 6) it is non-poisonous and can be recycled. Indium tin oxide has low film specific resistance and a visible light transmittance ranging from 80 to 90%, and thus is presently a main raw material for the transparent conductive film. However, since Indium contained in the Indium tin oxide material is a rare metal, the supply thereof is unstable and the cost thereof is increasing. Therefore, the development of an alternative material for replacement of Indium tin oxide become a main subject. Additionally, since the film made of indium tin oxide has a flexibility that is not sufficient for the application of the touch panel and the flexible panel, it has the disadvantages such as relative inferior durability and relative low liability.

In view of the aforesaid disadvantages of the indium tin oxide material, a carbon nanotube material has become a popular replacement for the indium tin oxide material because the carbon nanotube material has superior optical, electrical, magnetic, and mechanical properties. A conductive film made of single-walled carbon nanotubes (referred to as "SWNTs" hereinafter) has been developed in a commercial application.

The conductive film of the SWNTs is made primarily by a filtration method or a spraying method. The filtration method includes the steps of: synthesizing the SWNTs by a laser method, acid washing the SWNTs by a concentrated nitric acid solution, adding the SWNTs into a solvent containing a specific surfactant to form a dispersion of the SWNTs, filtering the dispersion of the SWNTs onto a filtration membrane to form a film of the SWNTs on the membrane, spreading the film of the SWNTs together with the filtration membrane onto a transparent substrate, and removing the filtration membrane using acetone so as to produce the film of the SWNTs (see, for example, "Transparent Conductive Carbon Nanotube Films" by Z. Wu etc., Science 2004, 305, 1273, and "Effect of SOC12 Treatment on Electrical and Mechanical Properties of Single-Wall Carbon Nanotube Networks" by U. Dettlaff-Weglikowska etc., J. Am. Chem. Soc., 2005, 127, 5125-5131).

The spraying method for making the conductive film of the SWNTs includes the steps of: dispersing a predetermined amount of the SWNTs into a solvent containing a specific surfactant to form a dispersion of the SWNTs, centrifuging the dispersion of the SWNTs, and spraying the supernatant solution of the SWNTs on a substrate of polyethylene terephthalate following by several rinsings in deionized water and drying so as to make the conductive film of the SWNTs (See, for example, "Effect of Acid Treatment on Carbon Nanotube-Based Flexible Transparent Conducting Films", J. Am. Chem. Soc., 2007, 129, 7758-7759).

Although various methods for making the conductive film of the SWNTs have been researched and developed for replacement of the indium tin oxide film, there is still a need in the art to provide a method for making a conductive film of carbon nanotubes having good performance in transparence, conductivity, and flexibility in a simple and low-cost manner.

SUMMARY OF THE INVENTION

Therefore, at least one object of the present invention is to provide a method for making a conductive film of carbon nanotubes in a manner of simplifying production procedure and reducing costs.

The method for making a conductive film of carbon nanotubes according to embodiments of this invention includes the steps of: a) preparing a carbon nanotube solution having a viscosity ranging from 1 to 50 c.p. at a room temperature of approximately 20 to 30° C. and containing a plurality of multi-walled carbon nanotubes; b) atomizing the carbon nanotube solution to form a plurality of atomized particles including the carbon nanotubes; c) providing a carrier gas to carry the atomized particles to a substrate disposed on a spin coating equipment; and d) spin coating the atomized particles on the substrate to form a conductive film of carbon nanotubes on a surface of the substrate.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION

Figure 1:
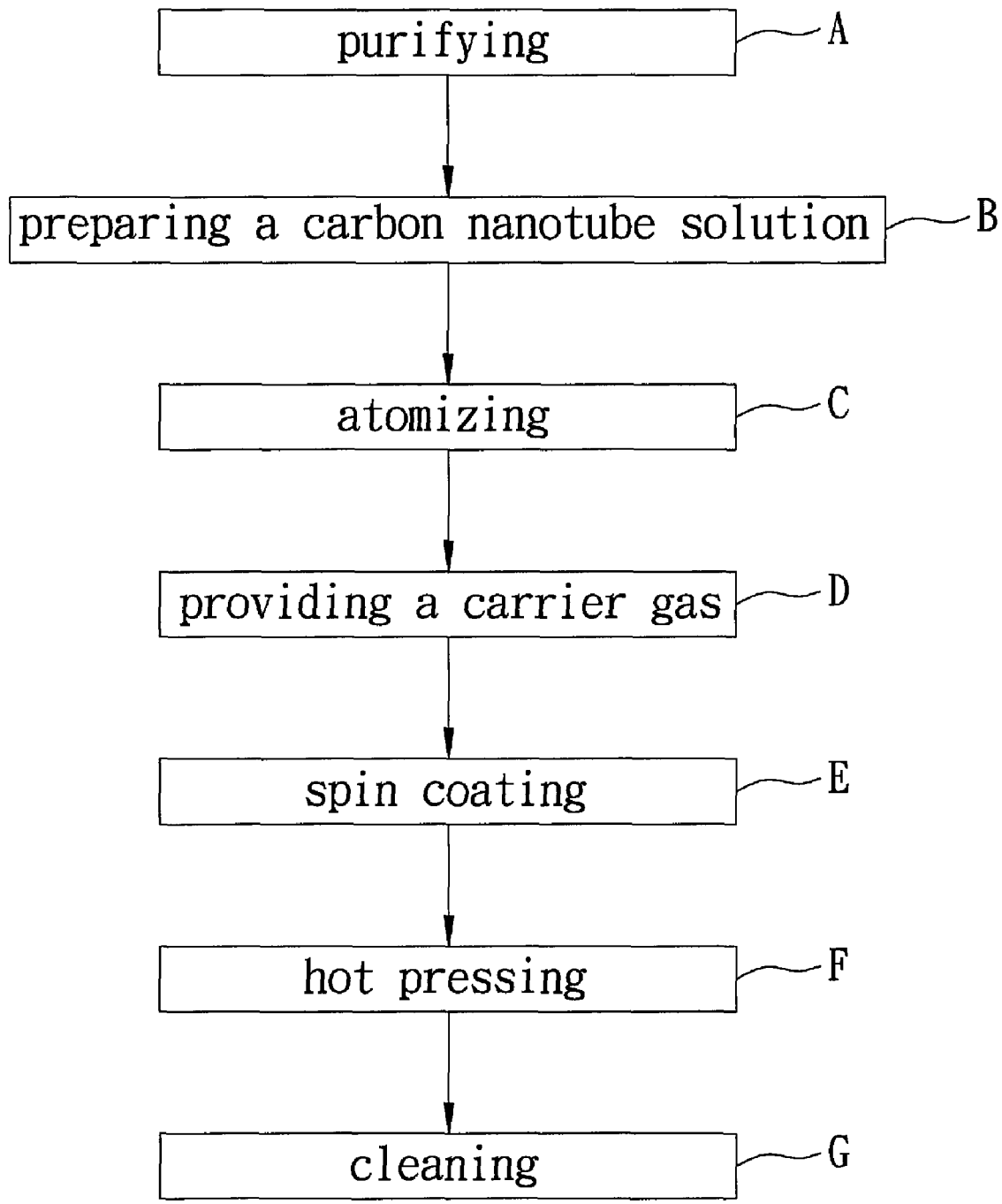
FIG. 1 is a flow chart of an embodiment of a method for making a conductive film of carbon nanotubes.
Figure 2:
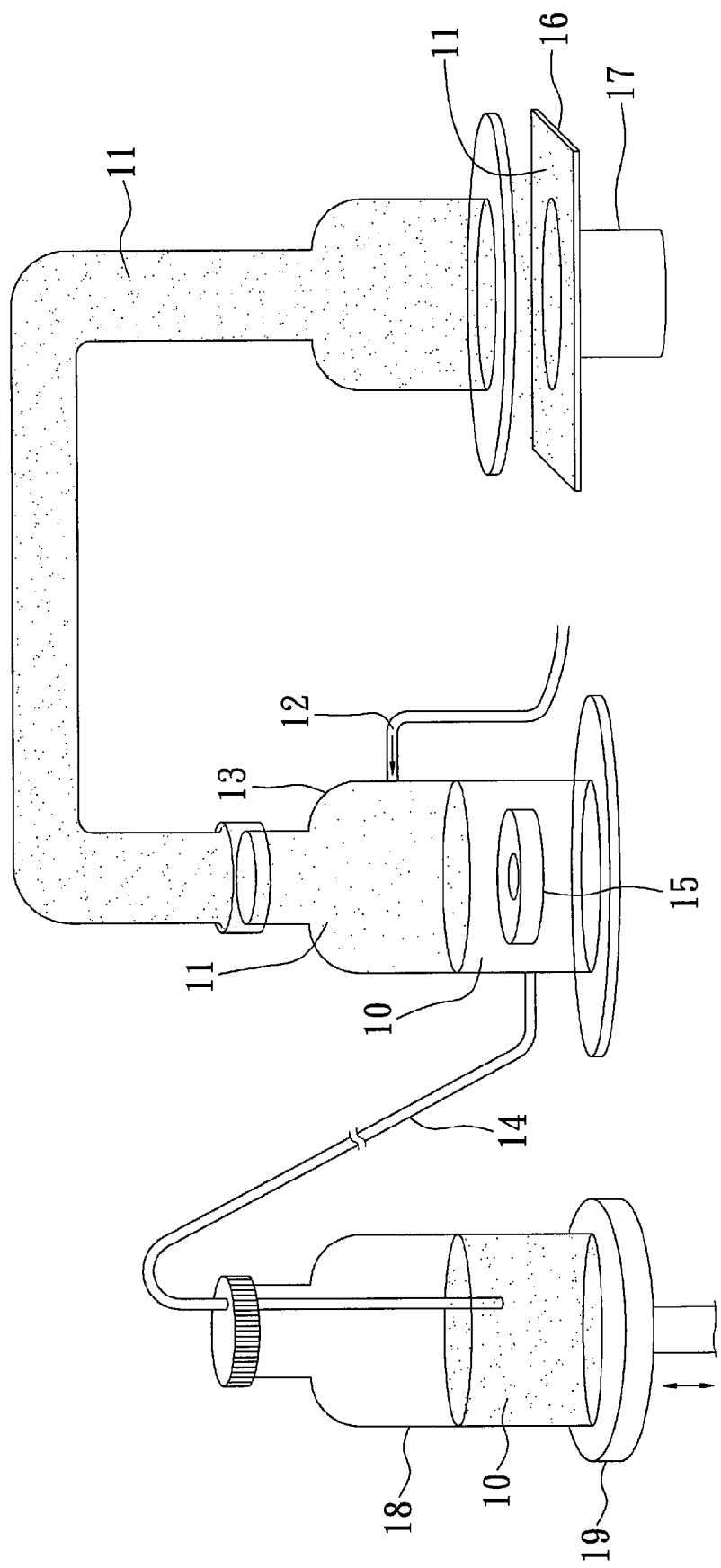
FIG. 2 is a schematic view illustrating an embodiment of an equipment for performing the embodiment of FIG. 1.

Referring to FIGS. 1 and 2, an embodiment of the method for making a conductive film of carbon nanotubes includes the steps of:

A) Purifying:

A carbon nanotube component containing a plurality of multi-walled carbon nanotubes is purified by acid washing with a concentrated hydrochloric acid, washing with water, precipitating, and vacuum drying to remove the impurities, such as ferric oxide, amorphous carbons, surface functional groups, adhered on or blended in the multi-walled carbon nanotubes so as to increase the conductivity and the photoelectric performance of the multi-walled carbon nanotubes.

B) Preparing a Carbon Nanotube Solution:

1 part by weight of the carbon nanotube component and 1 part by weight of a surfactant are added into 1,000-1,000,000 parts by weight of a solvent to prepare a carbon nanotube solution 10, which has a viscosity ranging from 1 to 50 c.p. at a room temperature of approximately 20 to 30° C. and which contains a plurality of the multi-walled carbon nanotubes.

The surfactant is used for preventing the aggregation of the multi-walled carbon nanotubes. The surfactant suitable for embodiments of the method of the present invention is sulfated alcohol, alkylsulfonate, α-olefin sulfonate, quaternary ammonium salt, polyoxyethylene, and alcohol ethoxylate, or combinations thereof.

In some embodiments, the surfactant is sodium salt of $C_4$-$C_{18}$ straight-alkyl sulfonate ($RSO_3^-Na^+$, wherein R is a straight $C_4$-$C_{18}$ alkyl group), potassium salt of $C_4$-$C_{18}$ straight-alkyl sulfonate ($RSO_3^-K^+$, wherein R is a straight $C_4$-$C_{18}$ alkyl group), sodium salt of $C_4$-$C_{18}$ straight-alkyl sulfate ($ROSO_3^-Na^+$, wherein R is a straight $C_4$-$C_{18}$ alkyl group), potassium salt of $C_4$-$C_{18}$ straight-alkyl sulfate ($ROSO_3^-K^+$, wherein R is a straight $C_4$-$C_{18}$ alkyl group), sodium salt of $C_4$-$C_{18}$ straight-alkyl benzene sulfonate ($RC_6H_4SO_3^-Na^+$, wherein R is a straight $C_4$-$C_{18}$ alkyl group), potassium salt of $C_4$-$C_{18}$ straight-alkyl benzene sulfonate ($RC_6H_4SO_3^-K^+$, wherein R is a straight $C_4$-$C_{18}$ alkyl group), sodium salt of $C_4$-$C_{18}$ straight-alkyl benzene sulfate ($ROC_6H_4SO_3^-Na^+$, wherein R is a straight $C_9$-$C_{18}$ alkyl group), potassium salt of $C_4$-$C_{18}$ straight-alkyl benzene sulfate ($ROC_6H_4SO_3^-K^+$, wherein R is a straight $C_4$-$C_{18}$ alkyl group), $C_2$-$C_{16}$ straight-alkyl quaternary ammonium salt, α-olefin sulfonate ($RCH=CH(CH_2)_n—SO_3M$, wherein n=14~16, and M is a alkali metal ion), polyoxyethylene $C_2$-$C_{16}$ alkyl ether ($RO(CH_2CH_2O)_nH$, wherein R is a $C_2$-$C_{16}$ alkyl group and n=5~30), or combinations thereof. The surfactant used in this preferred embodiment is sodium dodecyl sulfate.

The solvent suitable for embodiments of the method of the present invention is water, ethanol, isopropanol, acetone, or combinations thereof.

In formulating the carbon nanotube solution 10, after adding the carbon nanotube component and the surfactant into the solvent, the carbon nanotube solution 10 is processed using a probe type sonicator (SONICS® VCX750 supplied by Sonics & Materials, Inc.) having power of 750 W for 5 minutes at 20% of the power and then for 5 minutes at 39% of the power so as to prevent the aggregation of the multi-walled carbon nanotubes and to obtain a homogeneous dispersion.

C) Atomizing:

Specifically referring to FIG. 2, the carbon nanotube solution 10 is atomized at a supersonic atomizing frequency so as to form a plurality of atomized particles 11 including the carbon nanotubes. Specifically, the carbon nanotube solution 10 is contained in an atomizing container 13 and is maintained 10 at a constant level using a siphon 14 interconnecting the atomizing container 13 and a reservoir 18, thereby a supersonic atomizing member 15 for generating the supersonic atomizing frequency is maintained at a constant depth below the level of the carbon nanotube solution 10 so as to produce the atomized particles 11 having a desirable particle size. The reservoir 18 is disposed on an elevating device 19. The level of the carbon nanotube solution 10 in the atomizing container 13 can be controlled by adjusting the height of the elevating device 19. In some embodiments, the reservoir 18 can be provided with a probe type sonicator (not shown) to maintain a homogeneous dispersion of the carbon nanotube solution 10 in the reservoir 18.

In some embodiments, the supersonic atomizing frequency ranges from 20 KHz to 2.45 MHz. The supersonic atomizing frequency used in this preferred embodiment is 1.65 MHz, and the supersonic atomizing member 15 used in this preferred embodiment is an atomizing transducers M165D25 or M165D20 supplied by Pro-Wave Electronic Corp. The atomized particles 11 have a particle size ranging from 0.5 to 50 μm, and in some embodiments, preferably ranging from 2 to 7 μm. The atomized particles 11 used in some of these embodiments have a particle size of about 3 μm.

The frequency of the supersonic atomizing member 15 for producing the atomized particles 11 having a desirable particle size can be determined from the following formula:

$$D = \alpha \left[ \frac{8\pi T}{\rho f^2} \right]$$

wherein

D is the particle size of the atomized particles; T is a surface tension coefficient (N/cm);

ρ is the density of the carbon nanotube solution; f is the supersonic atomizing frequency; and α is a constant of 0.34 (Ultrasonics Volume 22, Issue 6, November 1984, Pages 259-260).

D) Providing a Carrier Gas:

A carrier gas 12 is provided to carry the atomized particles 11 to a substrate 16 disposed on a spin coating equipment 17. In some embodiments, the carrier gas 12 has a flow rate ranging from 1 to 200 L/min. The carrier gas 12 used in these embodiments is nitrogen and has a flow rate of 22 L/min.

E) Spin Coating:

The atomized particles 11 carried onto the spin coating equipment 17 are spin coated on the substrate 16 to form a conductive film of carbon nanotubes on a surface of the substrate 16.

The substrate 16 is pretreated by wet spin coating at alternate spinning speeds of 300 r.p.m. (revolutions per minute) and 450 r.p.m., followed by initial-cast spin coating at a spinning speed increasing from 450 r.p.m. to 6000 r.p.m. The substrate 16 is then subject to multiple cycles of repeat final-cast spin coating conducted sequentially from a low spinning speed to a medium spinning speed and a high spinning speed in a speed ratio of 2-3:3-6:8-40. 20 In these embodiments, the low spinning speed ranges from 300 to 450 r.p.m., the medium spinning speed ranges from 450 to 900 r.p.m., and the high spinning speed ranges from 1200 to 6000 r.p.m.

F) Hot Pressing:

The conductive film of carbon nanotubes is hot pressed against the substrate 16 so as to provide the conductive film with a compact and densified structure for increasing the conductivity of the conductive film. In some embodiments, the hot pressing is conducted at a temperature ranging from 50 to 110° C. under a pressure ranging from 1 to 200 kg/cm$^2$ for a period ranging from 30 seconds to 30 minutes. In these embodiments, the hot pressing is conducted at a temperature of 70° C. under a pressure of 100 kg/cm$^2$ for 30 minutes. Generally, the conductivity of the conductive film of carbon nanotubes is increased by extending the period for hot pressing. However, the increase of the conductivity is not appreciable when the period for hot pressing is over 30 minutes.

G) Cleaning:

The substrate 16 coated with the conductive film of carbon nanotubes is treated for five times by rinsing with deionized water for 5 to 30 minutes and soaking in fresh deionized water for 2 hours. The substrate 16 is then soaked in ethanol for 2 hours, and is vacuum dried at a temperature of 60° C. so as to remove the residual surfactant from the conductive film of carbon nanotubes. A product of the conductive film of carbon nanotubes coated on the substrate 16 can be obtained thereby.

EXAMPLE 1

A concentrated hydrochloric acid solution (250 ml, 6M) was added with 1 g of multi-walled carbon nanotubes (MWNTs), was stirred for 24 hours, and was washed with water following by precipitation for 6 times. The aforesaid procedure was repeated for 3 times with fresh hydrochloric acid solution (250 ml, 6M) and fresh water each time so as to purify the MWNTs. The purified MWNTs were vacuum dried at 80° C. for 12 hours and at 250° C. for 24 hours, and was then baked in a nitrogen-filled oven at 400° C.

10 mg of the purified MWNTs and 10 mg of sodium decyl sulfate were added into 1 L of deionized water to obtain a solution of the MWNTs. The solution of the MWNTs was acted by a probetypesonicator (SONICS® VCX750 supplied by Sonics & Materials, Inc.) having power of 750 W for 5 minutes at 20% of the power and then for 5 minutes at 39% of the power so as to prevent the aggregation of the MWNTs and to disperse the solution of the MWNTs homogeneously.

The solution of the MWNTs was atomized using a supersonic atomizing member, which was placed at 3.0 cm below the level of the solution of MWNTs and which was operated at a supersonic atomizing frequency of 1.65 MHz, so as to produce atomized particles having a particle size of 3 μm at an atomizing rate of 25-30 ml/hr.

The atomized particles were carried by a carrier gas at a flow rate of 22 L/min to the substrate 16 disposed on the spin coating equipment 17.

The substrate 16 was washed with deionized water at a spinning speed of 500 r.p.m. for a period of 40 seconds, and was then washed with ethanol at a spinning speed of 800 r.p.m. for a period of 60 seconds.

Figure 3:
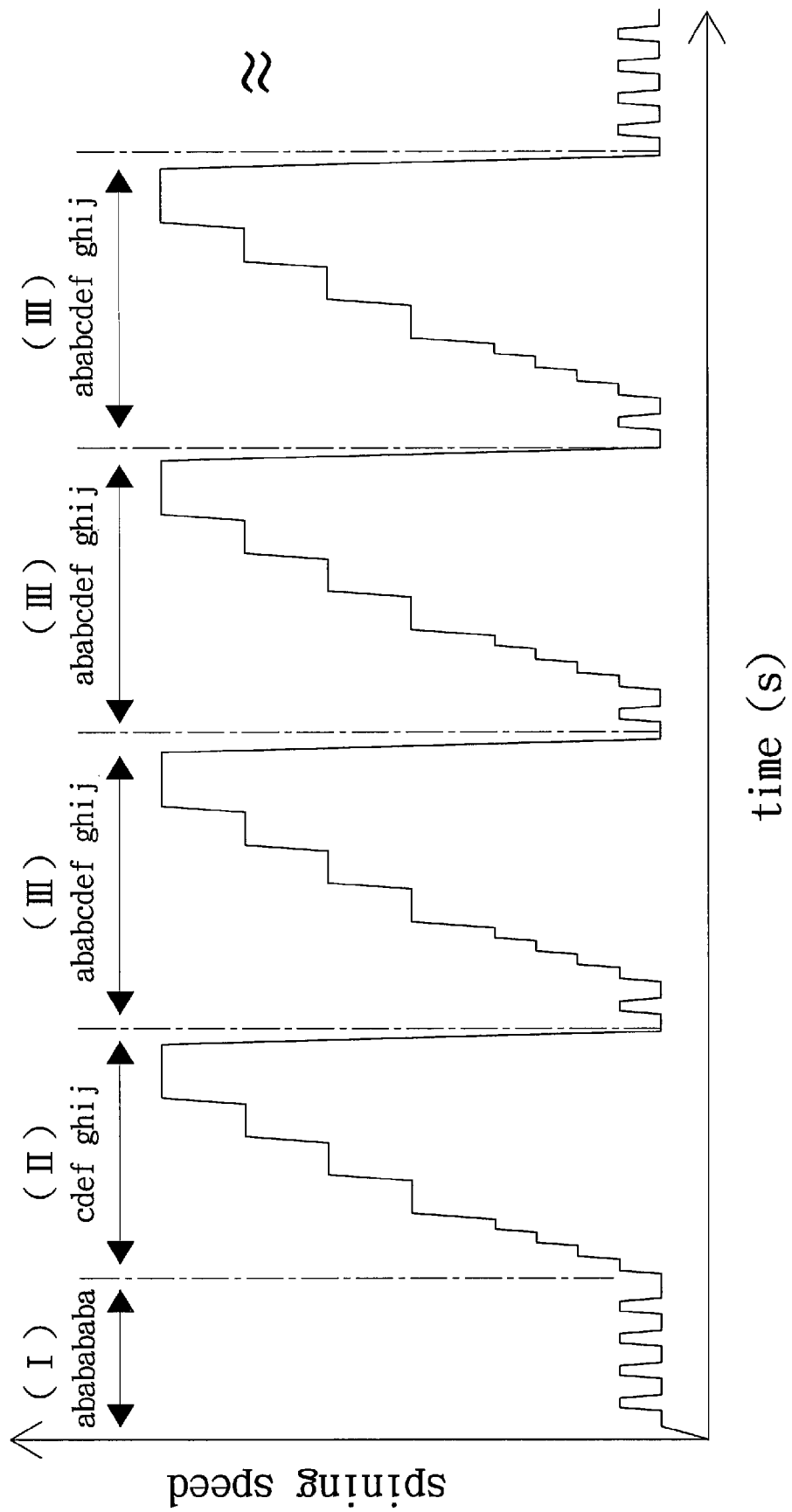
FIG. 3 is a graph showing an embodiment of spinning speed distribution for a spin coating step conducted in the embodiment of FIG. 1.

Referring to FIG. 3, during spin coating, a wet spin coating was carried out at alternate spinning speeds of 300 r.p.m. and 450 r.p.m. (region I). An initial-cast spin coating was carried out at a spinning speed increasing stepwise from 450 r.p.m. to 6000 r.p.m (Region II). A final-cast spin coating was carried out with a spinning speed that increases stepwise (region III). Multiple cycles of final-cast spin coating were repeated to form a conductive film of the MWNTs on a surface of the substrate 16. The characters in Regions I, II, III represent various spinning speeds shown in Table 1:

TABLE 1

|  | A | B | C | D | E | F | G | H | I | J |
|---|---|---|---|---|---|---|---|---|---|---|
| r.p.m. | 300 | 450 | 450 | 600 | 750 | 900 | 1200 | 2500 | 4500 | 6000 |
| Time(s) | 30 | 20 | 20 | 20 | 20 | 20 | 60 | 60 | 60 | 180 |

The thickness of the conductive film of the MWNTs can be controlled by the spin coating period, especially the spin coating periods for the speeds c-f. Generally, the overall spin coating period ranges from 10 to 60 minutes.

Hot pressing was carried out using upper and low hot-press molds of a hot-press device, which were heated to 70±0.25° C. and were maintained at that temperature for 1 hour. Four sheets of polyethylene terephthalate (PTE, 5 cm×5 cm) were cleaned with deionized water, ethanol, deionized water, acetone, deionized water in this sequence. The substrate 16 coated with the conductive film of the MWNTs was disposed between the PET sheets with two of the PET sheets at each side of the substrate 16 to form a stack, which in turn was disposed between two stainless plates (10 cm×10 cm) and was hot pressed between the upper and low hot-press molds at a pressure of 100 kg/cm$^2$ for 30 minutes.

Figure 4:
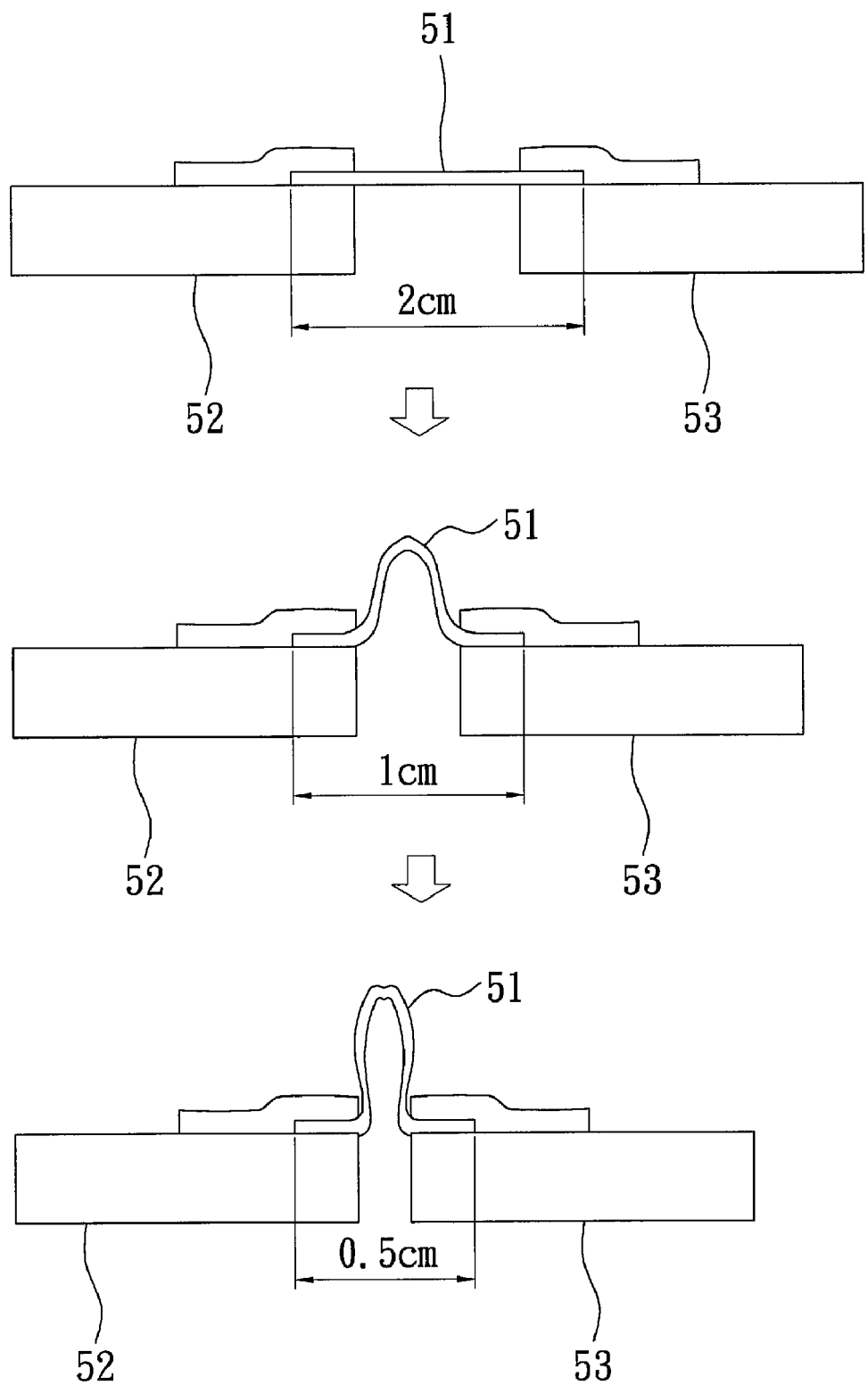
FIG. 4 is a schematic view illustrating an embodiment of a procedure for a flexibility test for a conductive film of carbon nanotubes.

The substrate 16 coated with the conductive film of the MWNTs after hot pressing was cleaned following the procedure of the aforesaid cleaning step G). Flexural Test: Referring to FIG. 4, two opposite end portions of a specimen 51 of 1 cm×2 cm in a lengthwise direction were fastened on a stationary clamp 53 and a movable clamp 52, respectively. The movable clamp 52 was moved toward the stationary clamp 53 to bend the specimen 51 until the distance of the two opposite end portions was 0.5 cm. The movable clamp 52 was then moved away from the stationary clamp 53 until the distance of the two opposite end portion was 2.0 cm. The aforesaid bending procedure was repeated and the sheet resistance of the specimen 51 was measured before bending and after each bending procedure.

A specimen of a conductive film of the multi-walled carbon nanotubes coated on a PET substrate (referred as to a CNT/PET specimen) and a specimen of a conductive film of indium tin oxide coated on a PET substrate (referred as to an ITO/PET specimen) were tested according to the aforesaid flexural test process. The sheet resistance of the ITO/PET specimen before the bending process is about 120 $\Omega/cm^2$, and the sheet resistance of the CNT/PET specimen before the bending process is about 100 $\Omega/cm^2$. Since unstable variation of the sheet resistances of the ITO/PET specimen and the CNT/PET specimen occurs at the initial stage of bending, measurement of the sheet resistances of the ITO/PET specimen and the CNT/PET specimen began after 50 times of bending to obtain stable sheet resistance values. The sheet resistance of the ITO/PET specimen after 50 times of bending is about 5 $\Omega/cm^2$, and the sheet resistance of the CNT/PET specimen after 50 times of bending is about 3 $\Omega/cm^2$. The sheet resistances of the ITO/PET specimen and the CNT/PET specimen after 100, 250, 500 times of bending were also measured and recoded in Table 2.

TABLE 2

| | Bending Times | | | | | |
| --- | --- | --- | --- | --- | --- | --- |
| | 100 | | 250 | | 500 | |
| | *Re ($\Omega/cm^2$) | **I.R | Re. ($\Omega/cm^2$) | I.R. | Re. ($\Omega/cm^2$) | I.R. |
| ITO/PET | 6.5K | 30% | 6.8K | 35% | 6.8K | 35% |
| CNT/PET | 3.4K | 10% | 3.6K | 20% | 3.7K | 20% |

*Re. = sheet resistance
**I.R. = increase rate of the sheet resistance

As shown in Table 2, variation of the sheet resistance 2 of the CNT/PET specimen is relatively small as compared to variation of the sheet resistance of the ITO/PET. It is demonstrated that the conductive film of the present invention has a superior flexibility (i.e., variation of the sheet resistance of the conductive film due to the bending is relatively small).

Reproducibility:

Five CNT/PET specimens were produced according to the procedure of Example 1, and the transmittances thereof at different wavelengths were measured. The results were shown in FIG. 5. Curves 61-16 indicate the results of the five CNT/PET specimens, respectively.

Figure 5:
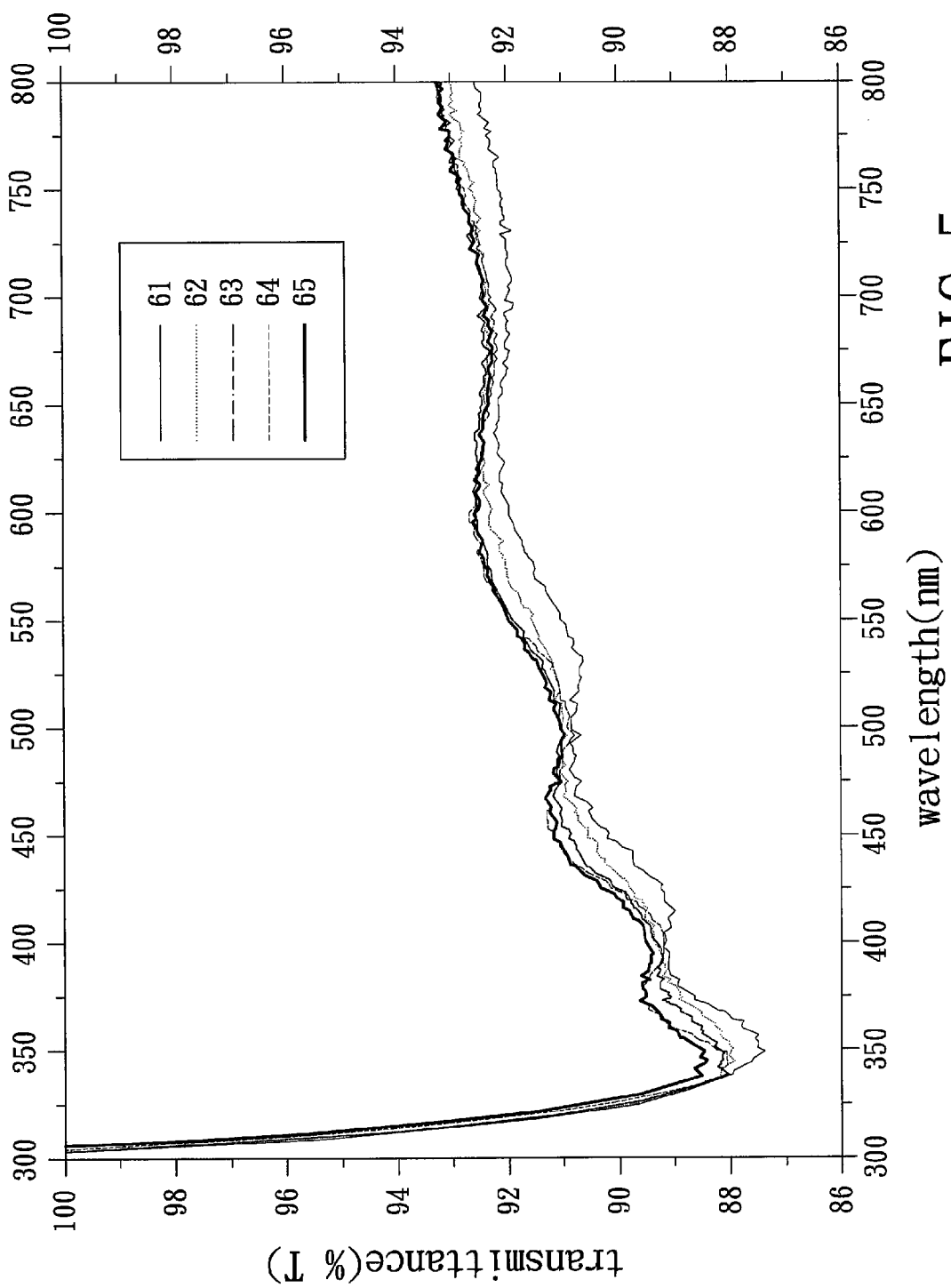
FIG. 5 is a graph showing embodiments of transmittances of the various conductive films of carbon nanotubes made by the embodiment of FIG. 1.

As shown in FIG. 5, the transmittance profiles of the five CNT/PET specimens are similar, it means that the method for making a conductive film of carbon nanotubes of the present invention has good producibility.

The mean derivations of the transmittances (% T) of the five CNT/PET specimens at specific wavelengths (i.e., 350 nm, 400 nm, 450 nm, 500 nm, and 550 nm) can be calculated by the formula:

$$\bar{d} = \sum_n |X - \bar{X}|$$

wherein
$\bar{d}$=mean derivation of the transmittance of the five CNT/PET specimens at a specific wavelength;
X=transmittance of the five CNT/PET specimens at a specific wavelength (% T);
$\bar{X}$=average transmittance of the five CNT/PET specimens at a specific wavelength;
n=number of the CNT/PET specimens (i.e., 5)

The mean derivations of transmittances of the five CNT/PET specimens at specific wavelengths are below 0.5% T. Therefore, the conductive film made by embodiments of the present invention has good producibility.

Figure 6:
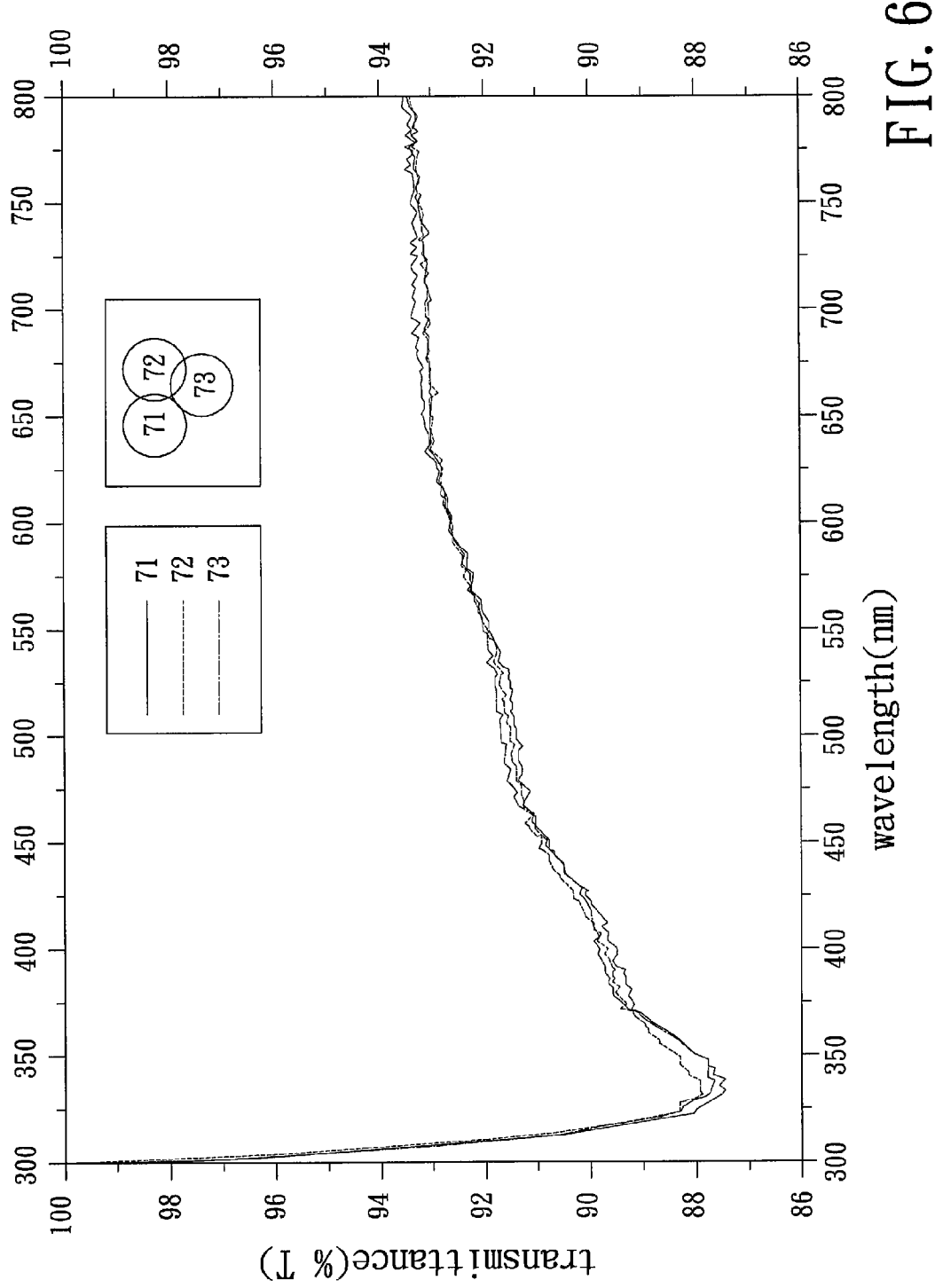
FIG. 6 is a graph showing embodiments of transmittances of a conductive film of carbon nanotubes made by the embodiment of FIG. 1 at various positions.

Evenness of Film Thickness:

Referring to FIG. 6, a CNT/PET specimen was 10 produced according to the procedure of Example 1, and the transmittances at three different areas thereof (Areas 71, 72, 73) were measured at a specific wavelength. The results were shown in FIG. 6. As shown in FIG. 6, the transmittances at different areas of the CNT/PET specimen are substantially identical, it means that thickness of the conductive film made by the method of the present invention has good evenness.

The mean derivation of the transmittances (% T) of a CNT/PET specimen at different areas for a specific 20 wavelength between 30 and 800 nm can be calculated using the formula.

$$\bar{d} = \sum_n |X - \bar{X}|$$

wherein
$\bar{d}$=the mean derivation of the transmittances of the 25 CNT/PET specimen at different areas for a specific wavelength;
X=a transmittance of the CNT/PET specimen at different areas for a specific wavelength;
$\bar{X}$=an average transmittance of the CNT/PET specimen at different areas for a specific wavelength;
n=number of the areas of the CNT/PET specimen for measurement of the transmittance (i.e., 3)

Figure 7:
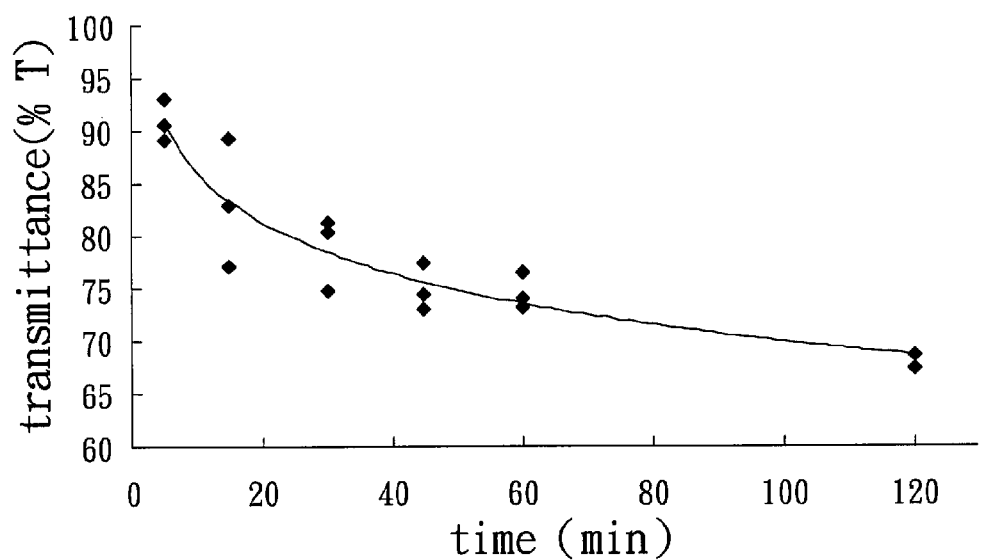
FIG. 7 is a graph showing embodiments of the relationship between the transmittance of the conductive film of carbon nanotubes made by the embodiment of FIG. 1 and the spinning period.
Figure 8:
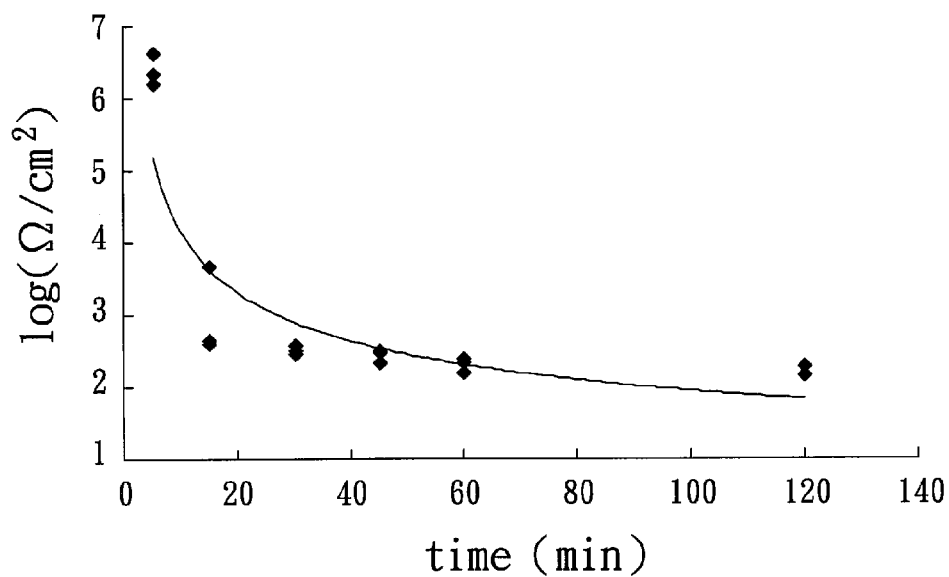
FIG. 8 is a graph showing embodiments of the relationship between the resistance of the conductive film of carbon nanotubes made by the embodiment of FIG. 1 and the spinning period.

The mean derivations of transmittances of the CNT/PET specimen at three different areas for specific wavelengths are below 0.3% T. Therefore, thickness of the conductive film made by embodiments of the method of the present invention has good evenness Variations of transmittance and sheet resistance due to spin coating period:

A number of CNT/PET specimens were produced following the procedure of Example 1 and using different spin coating periods which were 5, 15, 30, 45, 60, and 120 minutes. Three CNT/PET specimens were obtained for each of the spin coating periods. The transmittance at a wavelength of 550 nm and the sheet resistance were measured for each of the CNT/PET specimens, and the average values thereof were recorded and shown in Table 3 and in FIGS. 7 and 8.

TABLE 3

| Spin Coating Period (min) | Transmittal at 550 nm (T %) | Sheet Resistance ($\Omega/cm^2$) |
| --- | --- | --- |
| 5 | 93 | 4003333.0 |
| 5 | 91 | 2183333.0 |
| 5 | 89 | 1536667.0 |
| 15 | 89 | 464.5 |
| 15 | 83 | 446.6 |
| 15 | 77 | 391.4 |
| 30 | 81 | 382.0 |
| 30 | 80 | 321.8 |
| 30 | 75 | 286.5 |
| 45 | 75 | 325.5 |
| 45 | 78 | 304.1 |
| 45 | 73 | 218.4 |
| 60 | 77 | 249.0 |
| 60 | 74 | 224.7 |
| 60 | 73 | 163.6 |
| 120 | 69 | 154.3 |
| 120 | 69 | 203.0 |
| 120 | 68 | 154.3 |

Generally, the thickness of the conductive film of the CNT/PET specimens is increased when the spin coating period is increased. It is also shown in Table 3 and FIGS. 7 and 8 that the transmittance of the conductive film of the CNT/PET specimens is decreased when the spin coating period is increased (i.e., this indicates that the thickness of the conductive film is increased).

Additionally, the sheet resistance of the conductive film of the CNT/PET specimens is decreased when the spin coating period is increased (i.e., this means that the conductivity of the conductive film is increased). Since the sheet resistance suitable for commercial application of a conductive film ranges from 10 to 800 $\Omega/cm^2$, and since the sheet resistance suitable for the commercial application of a touch panel ranges from 200 to 800 $\Omega/cm^2$, the conductive film of carbon nanotubes made by embodiments of the method of the present invention is suitable for the commercial applications. Furthermore, the transmittance suitable for the commercial application of a conductive film at a wavelength of 550 nm ranges from 70 to 90%. The transmittance of the CNT/PET specimens at a wavelength of 550 nm ranges from 65 to 90%. It is shown that the conductive film of carbon nanotubes made by embodiments of the method of the present invention is suitable for the commercial applications in terms of the transmittance.

Figure 9:
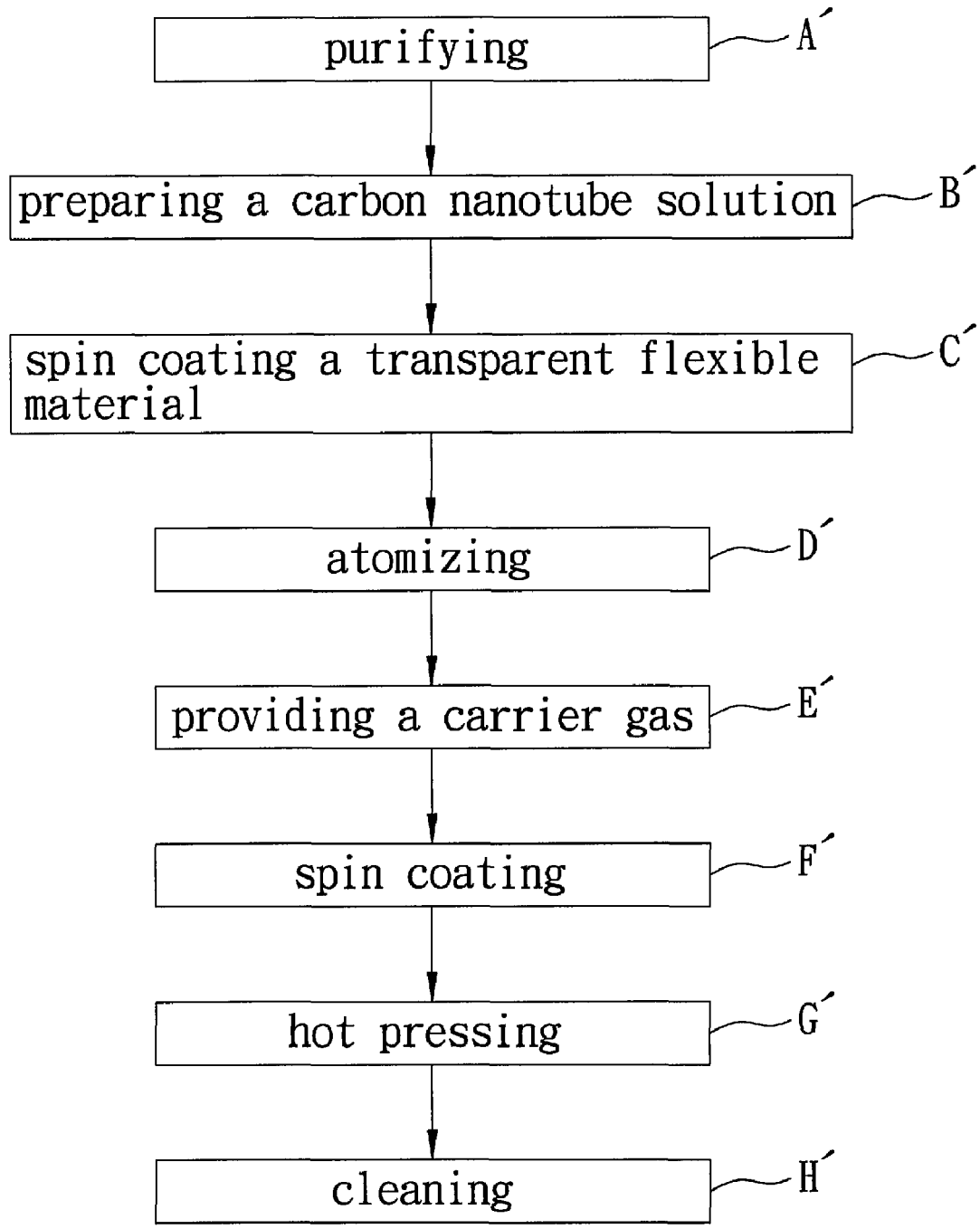
FIG. 9 is a flow chart of a another embodiment of a method for making a conductive film of carbon nanotubes according to this invention.
Figure 11:
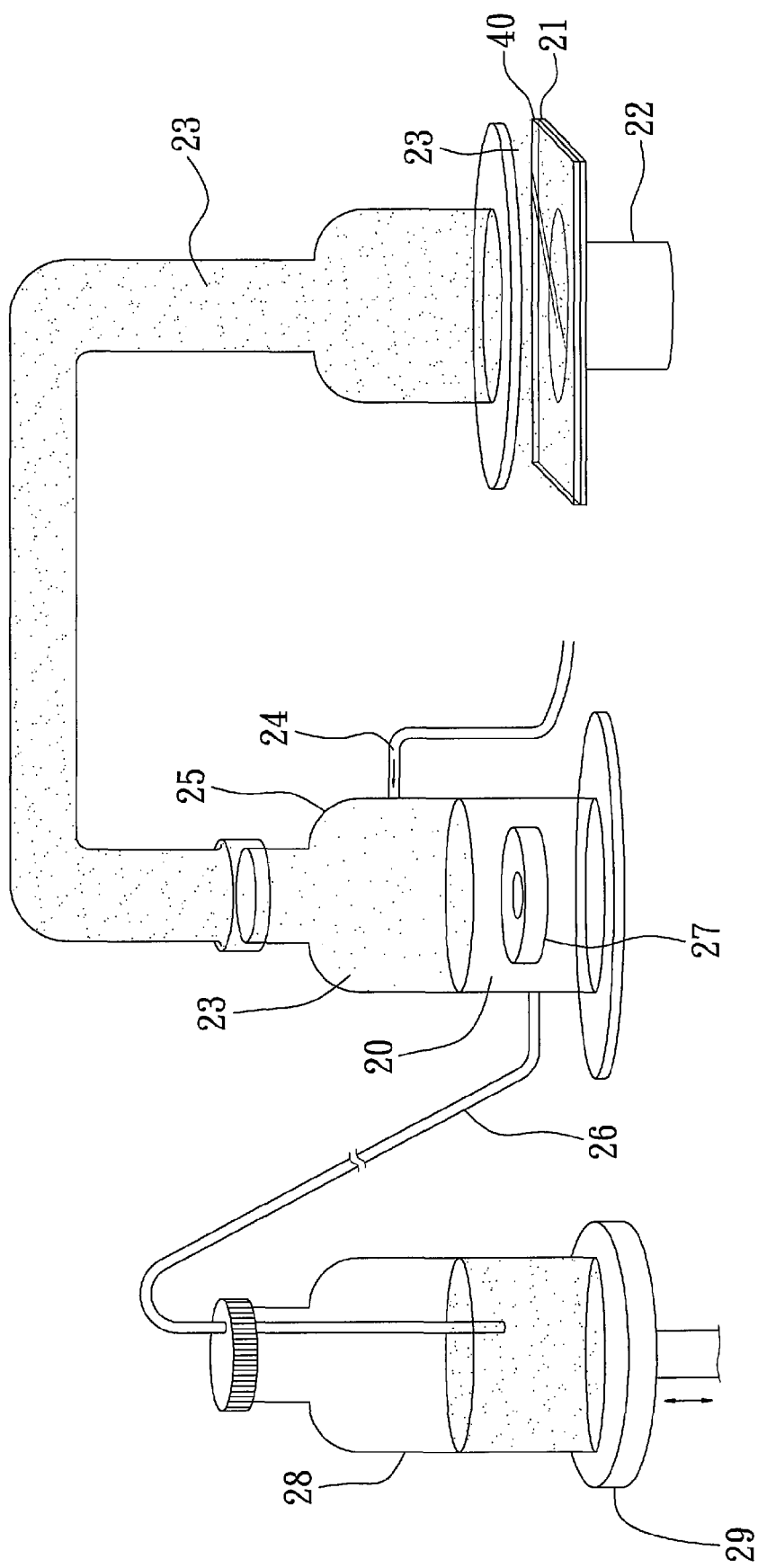
FIG. 11 is a schematic view illustrating an embodiment of equipment for performing embodiments of FIG. 9 and FIG. 10.

Referring to FIGS. 9 and 11, embodiments of the method for making a conductive film of carbon nanotubes of this invention includes the steps of:

A') Purifying:

This step is similar to the step A) of embodiments of FIGS. 1 and 2.

B') Preparing a Carbon Nanotube Solution:

This step is conducted in a manner similar to the step B) of embodiments of FIGS. 1 and 2 to prepare a carbon nanotube solution 20.

C') Spin Coating a Transparent Flexible Material:

A transparent flexible material is spin coated on a substrate 21 disposed on a spin coating equipment 22 to form a coating layer 40 of the transparent flexible material on the surface of the substrate.

In some embodiments, the transparent flexible material is polyvinyl alcohol, polyacrylic acid, polyethylene glycol, polymethyl methacrylate, polycarbonate, or combinations thereof. The transparent flexible material used in these embodiments is polyvinyl alcohol.

D') Atomizing:

Specifically referring to FIG. 11, the carbon nanotube solution 20 is atomized at a supersonic atomizing frequency so as to form a plurality of atomized particles 23 including the carbon nanotubes. Specifically, the carbon nanotube solution 20 is contained in an atomizing container 25 and is maintained at a constant level using a siphon 26 interconnecting the atomizing container 25 and a reservoir 28, thereby a supersonic atomizing member 27 for generating the supersonic atomizing frequency is maintained at a constant depth below the level of the carbon nanotube solution 20 so as to produce the atomized particles 23 having a desirable particle size. The reservoir 28 is disposed on an elevating device 29. The level of the carbon nanotube solution 20 in the atomizing container 25 can be controlled by adjusting the height of the elevating device 29.

The supersonic atomizing frequency used in these embodiments is identical to that used in the embodiments discussed in conjunction with FIGS. 1 and 2. The atomized particles 23 produced in these embodiments have a particle size substantially identical to that produced in the embodiments discussed in conjunction with FIGS. 1 and 2.

E') Providing a Carrier Gas:

A carrier gas 24 is provided to carry the atomized particles 23. The flow rate of the carrier gas 24 is identical to that of the carrier gas 12 used in the embodiments discussed in conjunction with FIGS. 1 and 2.

F') Spin Coating:

The atomized particles 23 carried onto the spin coating equipment 22 are spin coated on the coating layer 40 of the transparent flexible material so as to form a conductive film of carbon nanotubes on the coating layer 40 of the transparent flexible material on the surface of the substrate 21.

The spin coating step of this preferred embodiment is conducted in a manner substantially identical to that of the embodiments discussed in conjunction with FIGS. 1 and 2.

G') Hot Pressing:

The conductive film of carbon nanotubes and the coating layer 40 of the transparent flexible material is hot pressed against the substrate 21 so as to provide the conductive film with a compact and densified structure and to bond the conductive film of carbon nanotubes to the coating layer 40 by pressing the nanotubes into the coating layer 40.

In some embodiments, the hot pressing is conducted at a temperature ranging from 50 to 110° C. under a pressure ranging from 1 to 200 $kg/cm^2$ for a period ranging from 30 seconds to 30 minutes. In some embodiments, the hot pressing is conducted at a temperature of 90° C. under a pressure of 100 $kg/cm^2$ for 10 minutes.

H') Cleaning:

The cleaning step is conducted in a manner identical to the step G) of the embodiments discussed in conjunction with FIGS. 1 and 2.

As compared to the conductive film of carbon nanotubes made by the embodiments discussed in conjunction with FIGS. 1 and 2, the flexibility of the conductive film of carbon nanotubes made by the embodiments of FIG. 11 is further improved.

Figure 10:
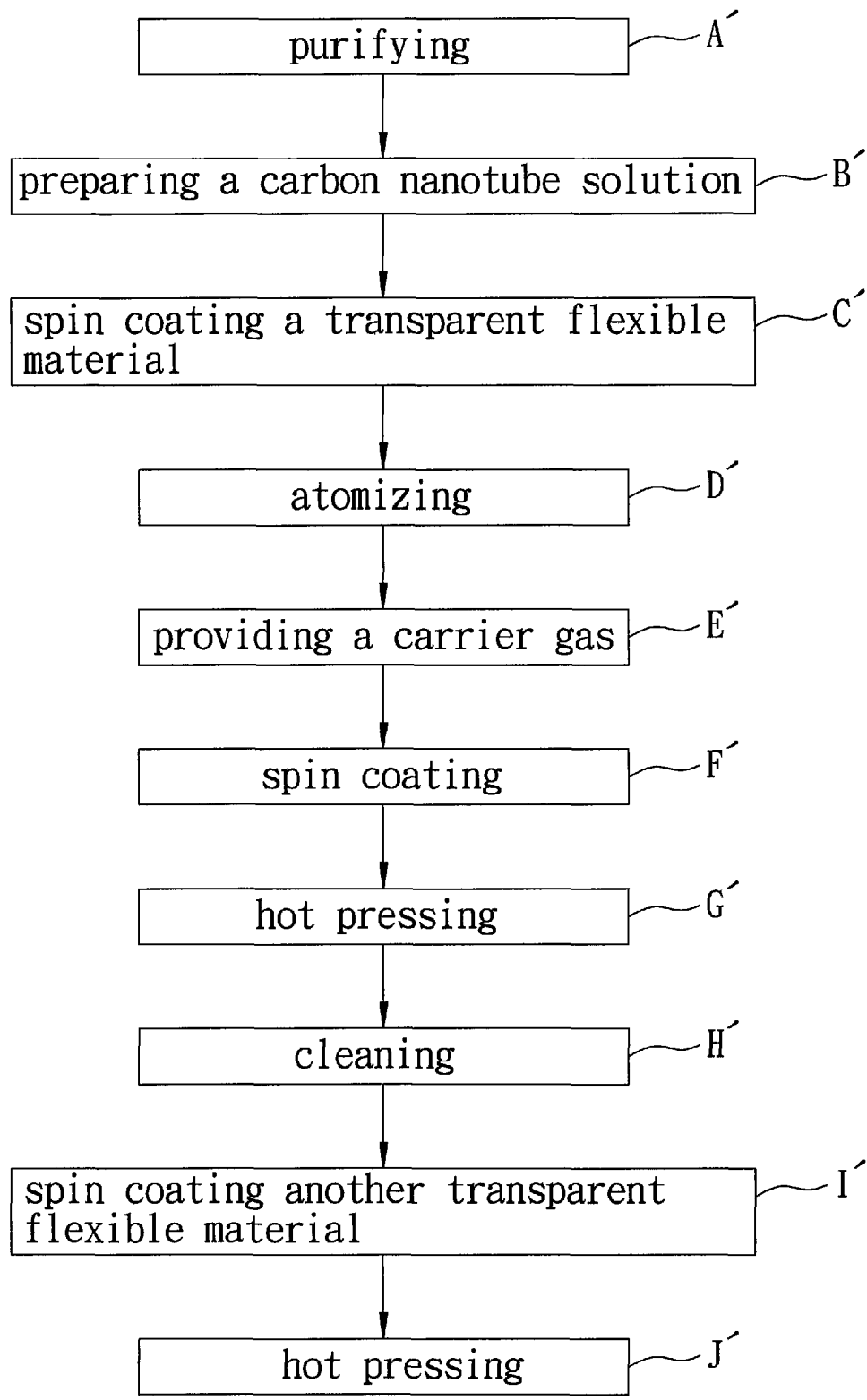
FIG. 10 is a flow chart of a another embodiment of a method for making a conductive film of carbon nanotubes according to this invention.

Referring to FIGS. 10 and 11, these embodiments of the method for making a conductive film of carbon nanotubes is similar to the embodiments of FIG. 9 except that in these embodiments, the following steps are further conducted after the step H') of embodiments of FIG. 9:

I') Spin Coating Another Transparent Flexible Material:

Another transparent flexible material is spin coated on the conductive film of carbon nanotubes so as to form a coating layer of the transparent flexible material on the conductive film of carbon nanotubes.

The transparent flexible material used in this step can be identical to or different from the transparent flexible material used in the step C') of the second preferred embodiment, and preferably, in some embodiments, is polyvinyl alcohol, polyacrylic acid, polyethylene glycol, polymethyl methacrylate, polycarbonate, or combinations thereof. The transparent flexible material used in this step of this embodiment is polyvinyl alcohol.

In order to provide the conductive film of carbon nanotubes made thereby has a desirable conductivity, the thickness of the coating layer of the transparent flexible material on the conductive film of carbon nanotubes is preferably in some embodiments smaller than 30 nm.

Specifically, the aforesaid steps C') and I') are conducted using a polyvinyl alcohol solution (50 mg/L, molecular weight of polyvinyl alcohol solution ranges 25 from 27000 to 32000) at 500 r.p.m. for 30 seconds, at 1000 r.p.m. for 60 seconds, and 6000 r.p.m. for 180 seconds with an amount of 0.25 ml of the polyvinyl alcohol solution for each dropwise addition. The thickness of each of the coating layers of the transparent flexible materials can be controlled by the spin coating period. Generally, the thickness of the coating layer 40 is larger than that of the coating layer of the transparent flexible material on the conductive film, and the thickness of the coating layer of the transparent flexible material on the conductive film should be smaller than 30 nm.

J') Hot Pressing:

The coating layer of the transparent flexible material on the conductive film of carton nanotube, the conductive film, and the coating layer 40 are hot pressed against the substrate 21 so as to compactly laminate the conductive film of carbon nanotubes between the coating layers of the transparent flexible materials.

In some embodiments, the hot pressing is conducted at a temperature ranging from 60 to 90° C. under a pressure ranging from 75 to 125 kg/cm² for a period of 30 minutes. In these embodiments, the hot pressing is conducted at a temperature of 90° C. under a pressure of 100 kg/cm² for 10 minutes.

Optionally, residual polyvinyl alcohol solution can be removed using an atomized water at a spinning speed of 3000 r.p.m.

EXAMPLE 2

A solution of the MWNTs (10 mg/L) was prepared in a manner identical to that used in Example 1.

A substrate (4 cm×4 cm) disposed on a spin coating equipment was treated by (i) rinsing with deionized water at a spinning speed of 300 r.p.m. for 30 seconds and washing with deionized water at a spinning speed of 500 r.p.m. for 40 seconds; (ii) washing with ethanol at a spinning speed of 800 r.p.m. for 60 seconds and at a spinning speed of 1200 r.p.m. for 60 seconds; and (iii) drying at a spinning speed of 4000 r.p.m. The aforesaid procedures (i), (ii), and (iii) were repeated twice so as to clear the substrate.

A polyvinyl alcohol solution (500 mg/L, molecular weight=27000-32000) was prepared. Five drops of the polyvinyl alcohol solution were provide on the substrate. The substrate was first spun at 450 r.p.m. for 30-60 seconds for collecting the polyvinyl alcohol solution at the center of the substrate, was spun at 600 r.p.m. for 15-30 seconds for preliminarily spreading the polyvinyl alcohol solution, was spun at 900 r.p.m. for 30-45 seconds for further spreading the polyvinyl alcohol solution, was spun at 4500 r.p.m. for 90-180 seconds for forming a coating layer of polyvinyl alcohol on the substrate, and finally was spun at 6000 r.p.m. for more than 120 seconds for preliminarily drying. The substrate coated with the coating layer of polyvinyl alcohol was baked at 150° C. for 3 hours.

Figure 12:
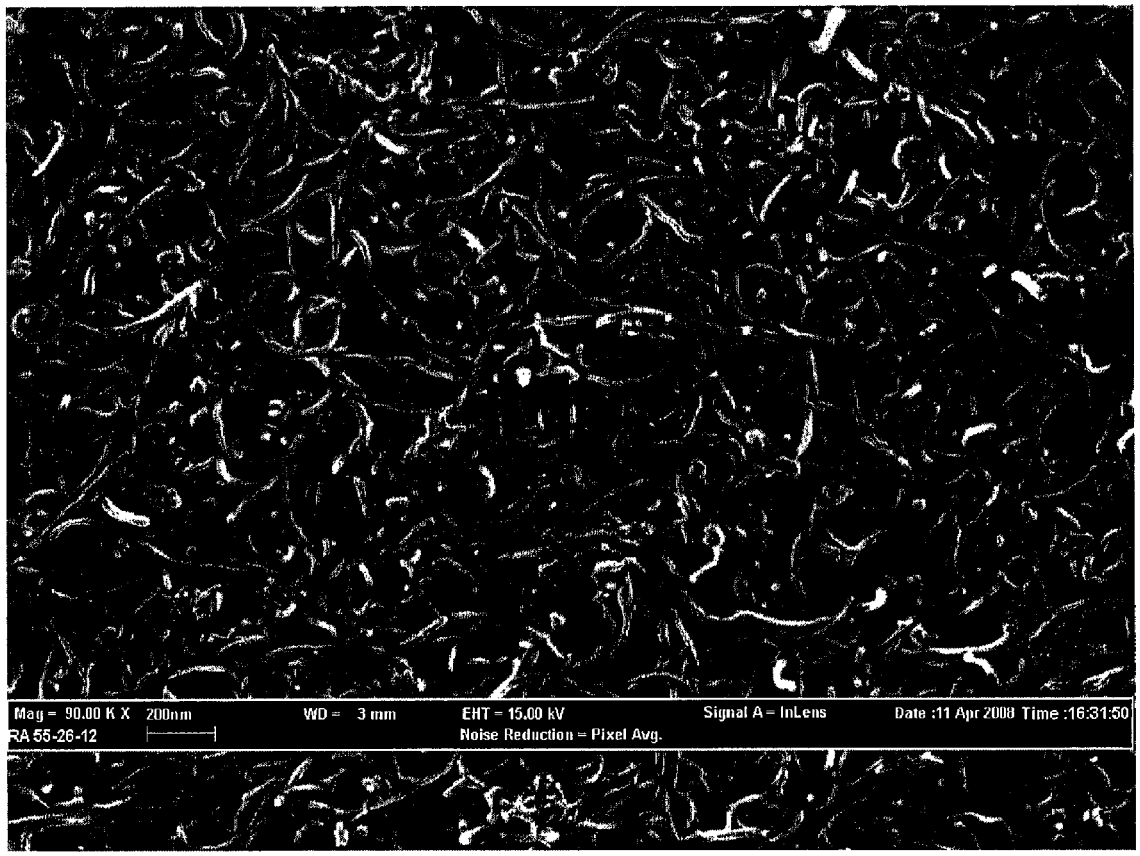
FIG. 12 is an embodiment of a scanning electron microscope image of a conductive film of carbon nanotubes made by an embodiment of FIG. 9.

The atomizing, spin coating, hot pressing, and cleaning procedures used in Example 1 were conducted so as to obtain a product of the conductive film of carbon nanotubes coated on the coating layer of polyvinyl alcohol on the substrate. A scanning electron microscope image of the product is shown in FIG. 12.

EXAMPLE 3

Figure 13:
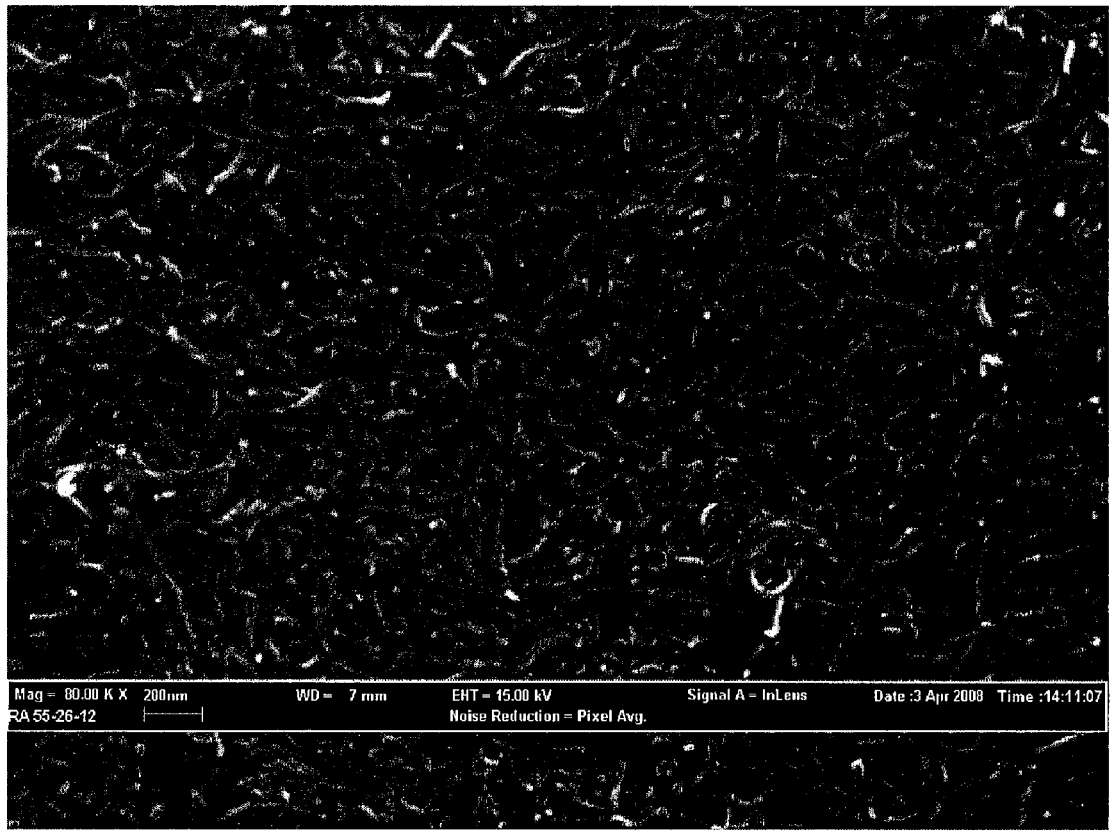
FIG. 13 is a scanning electron microscope image of a conductive film of carbon nanotubes made by an embodiment of FIG. 10.

The product of Example 2 was further processed using the aforesaid steps I') and J') to obtain a product in which another coating layer of polyvinyl alcohol is coated on top of the conductive film of carbon nanotubes. A scanning electron microscope image of the product is shown in FIG. 13.

Flexural Test:

A specimen of the product of Example 2 (referred as to a CNT/PVA/PET specimen) was subjected to the Flexural Test described hereinbefore and the result thereof was shown in Table 4. The test result of the CNT/PET specimen (i.e., a product made in Example 1) is also shown in Table 4. The sheet resistance of the CNT/PET specimen before bending is about 100 Ω/cm² and the sheet resistance of the CNT/PVA/PET specimen before bending is about 150 Ω/cm². The sheet resistance of the CNT/PET specimen after bending 50 times is about 3 Ω/cm², and the sheet resistance of the CNT/PVA/PET specimen after bending 50 times is about 360 Ω/cm². Table 4 shows the results for more than 50 times bending.

| | Bending Times | | | | | |
|---|---|---|---|---|---|---|
| | 100 | | 250 | | 500 | |
| | *Re ($\Omega/cm^2$) | **I.R | Re. ($\Omega/cm^2$) | I.R. | Re. ($\Omega/cm^2$) | I.R. |
| CNT/PET | 3.4K | 10% | 3.6K | 20% | 3.7K | 20% |
| CNT/PVA/PET | 379 | 5% | 397 | 10% | 399 | 10% |

*Re. = resistance
**I.R. = increase rate of the sheet resistance

As shown in Table 4, the increase rate of the sheet resistance of the CNT/PVA/PET specimen is low as compared to that of the CNT/PET specimen. It is demonstrated that a decrease in conductivity of the CNT/PVA/PET due to bending is small and that the CNT/PVA/PET specimen is resistant to bending and thus has a better flexibility.

Figure 14:
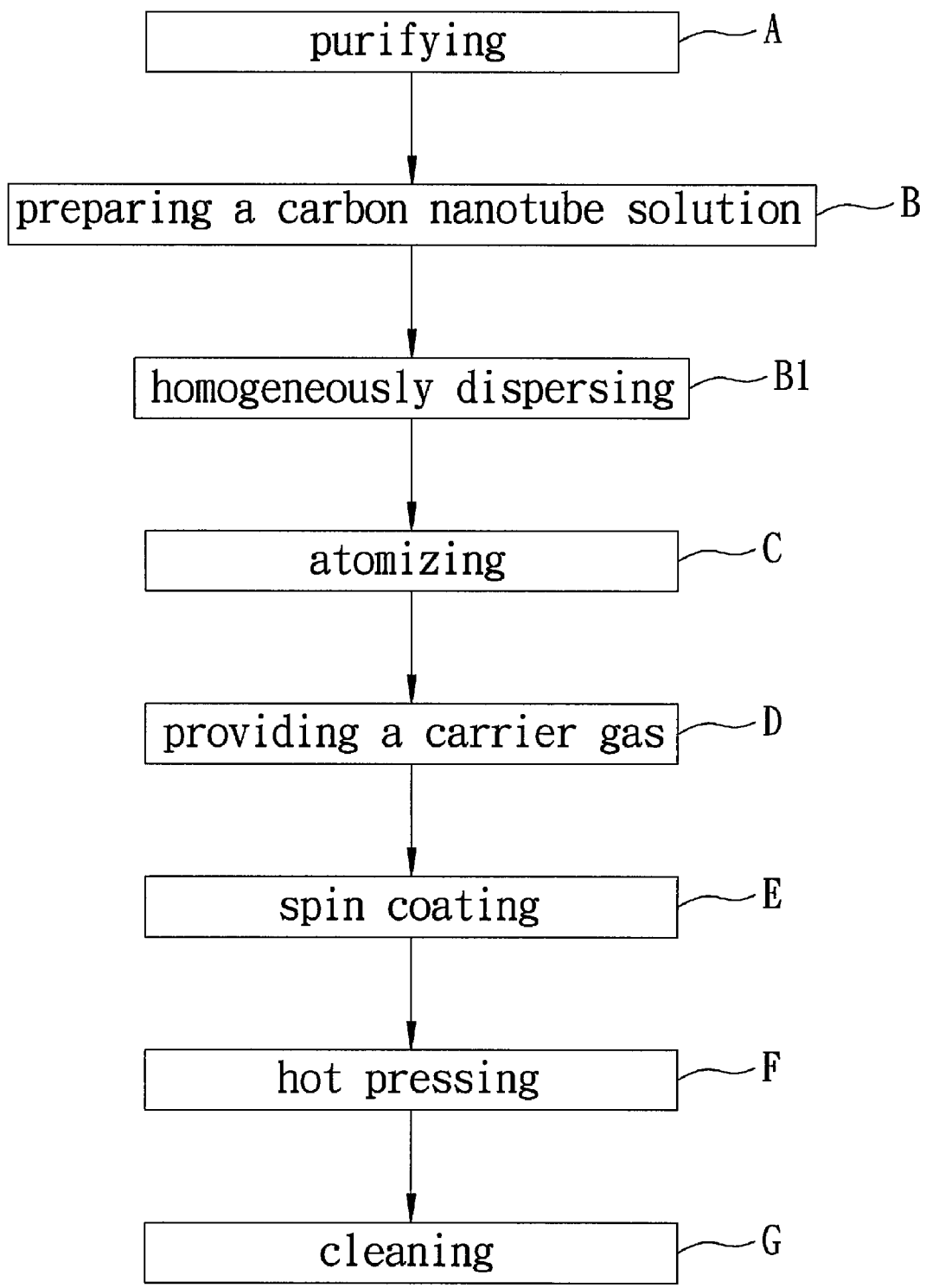
FIG. 14 is a flow chart of an embodiment of a method for making a conductive film of carbon nanotubes.
Figure 15:
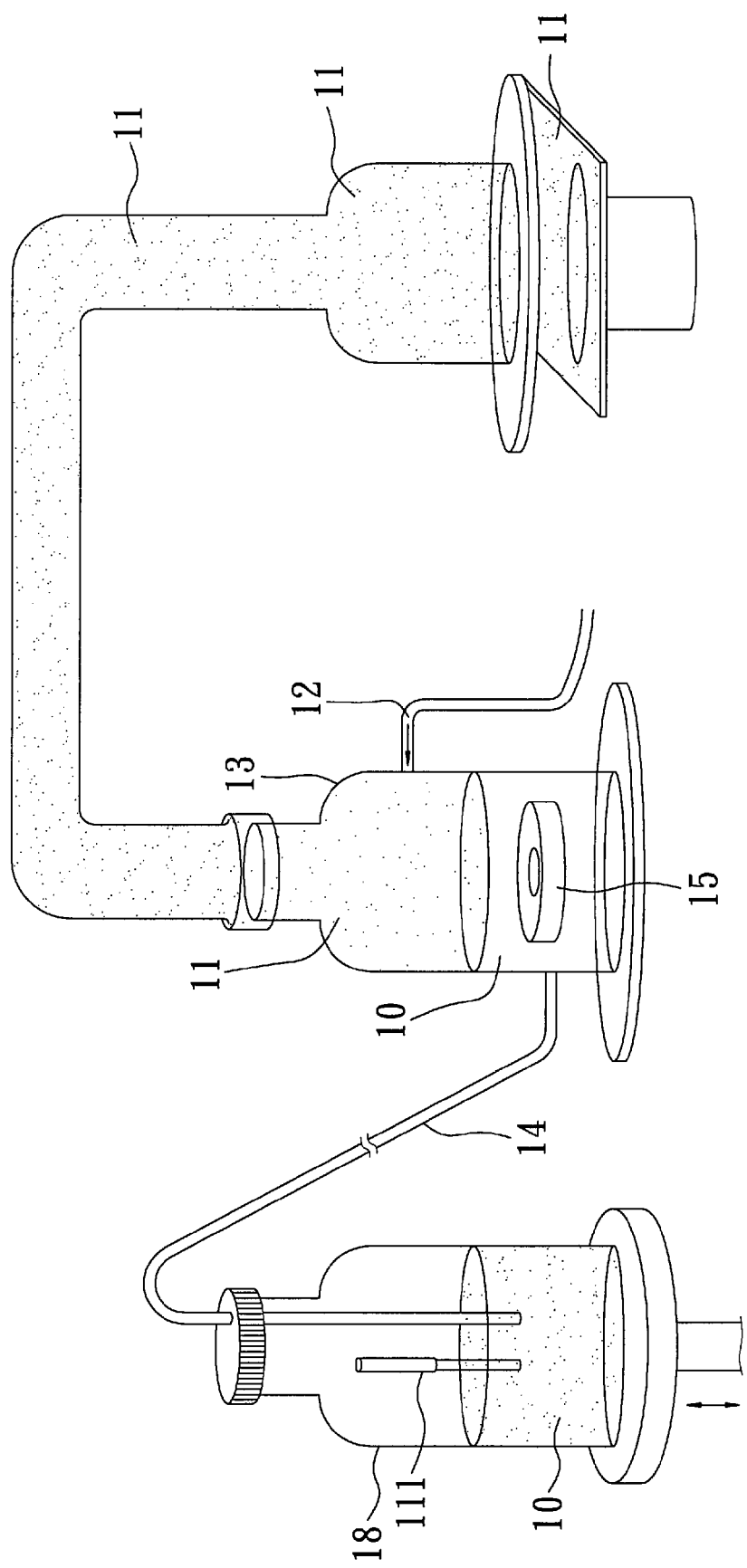
FIG. 15 is a schematic view illustrating an equipment for performing an embodiment of FIG. 14.

Transmittance at a Wavelength of 550 nm:

Tests for transmittance show that the transmittance at a wavelength of 550 nm for the CNT/PVA/PET specimen is about 90%, and transmittance at a wavelength of 550 nm for the specimen made by Example 3 (CNT with two PVA layers and PET) is 89%. As described hereinbefore, the transmittance at a wavelength of 550 nm for the commercial application of a conductive film ranges from 70 to 90%. Therefore, the conductive films of carbon nanotubes made in Examples 2 and 3 are suitable for the commercial applications in terms of the transmittance. Referring to FIGS. 14 and 15, another embodiment of the method for making a conductive film of carbon nanotubes is similar to the embodiments of FIGS. 1 and 2 except that the carbon nanotube solution 10 is prepared by adding 1 part by weight of the carbon nanotube component into 1,000-1,000,000 parts by weight of the solvent (i.e., no surfactant being added), and that the fourth preferred embodiment further includes a step B1), prior to the atomizing step, of homogeneously dispersing the carbon nanotube solution 10 in the reservoir 18 so as to prevent the aggregation of the multi-walled carbon nanotubes in the carbon nanotube solution 10 before the carbon nanotube solution 10 is supplied to the atomizing container 13 via the siphon 14 interconnecting.

Specifically, the homogeneous dispersion of the 15 carbon nanotube solution 10 in the reservoir 18 is achieved using a probe type sonicator111(SONICS®VCX750 supplied by Sonics & Materials, Inc.) having power of 750 W for 5 minutes at 20% of the power and then for 5 minutes at 39% of the power. Generally, the probe type sonicator is operated intermittently. For example, each operation can maintain the homogeneous dispersion of the carbon nanotube solution 10 for 20-30 seconds.

In view of the aforesaid, the method for making a conductive film of carbon nanotubes according to embodiments of this invention has the following advantages:

1. As compared to conventional methods such as spraying, ink-jetting, dip-coating, membrane-filtering, or sputtering, embodiments of the method of this invention involving the atomizing and spin coating procedures is a relatively simple and easy method which can be conducted using an easily available equipment.

2. Carbon nanotube conductive films having specific transmittance and sheet resistance can be easily produced by controlling the spin coating period to obtain a desirable film thickness. Therefore, embodiments of the method of this invention can be used to produce carbon nanotube conductive films having different specifications.

3. As shown in the result of the flexural test, the conductive film of carbon nanotubes made by embodiments of the method of this invention has an improved flexibility.

4. Since the multi-walled carbon nanotubes are used in the method of this invention, the production cost for embodiments of the method of this invention can be reduced as compared to the conventional method for making conductive film using indium tin oxide.

5. As shown in Examples 2 and 3 in which the conductive film product includes at least one coating layer of transparent flexible material, the conductive film product made by embodiments of the method of this invention has a further improved flexibility in addition to good transmittance and conductivity.

6. As shown in the test result at a wavelength of 550 nm, the conductive film of carbon nanotubes produced by embodiments of the method of this invention is suitable for the commercial applications in terms of the transmittance.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for making a conductive film of carbon nanotubes, comprising the steps of:
   a) preparing a carbon nanotube solution having a viscosity ranging from 1 to 50 c.p. at room temperature and containing a plurality of multi-walled carbon nanotubes;
   b) spin coating a first transparent flexible material on a substrate disposed on a spin coating equipment to form a coating layer of the first transparent flexible material on a surface of the substrate;
   c) atomizing the carbon nanotube solution to form a plurality of atomized particles including the carbon nanotubes;
   d) providing a carrier gas to carry the atomized particles to the coating layer of the first transparent flexible material while the substrate is disposed on the spin coating equipment; and
   e) spin coating the atomized particles on the coating layer of the first transparent flexible material to form a conductive film of carbon nanotubes on the coating layer of the first transparent flexible material.

2. The method as claimed in claim 1, wherein the atomized particles have a particle size ranging from 0.5 to 50 µm.

3. The method as claimed in claim 1, further comprising a step of hot pressing the conductive film of carbon nanotubes and the coating layer of the first transparent flexible material against the substrate after the step e).

4. The method as claimed in claim 3, wherein the hot pressing step is conducted at a temperature ranging from 50 to 110° C. under a pressure ranging from 1 to 200 kg/cm$^2$.

5. The method as claimed in claim 1, wherein the carbon nanotube solution further includes a solvent selected from the group consisting of water, ethanol, isopropanol, and acetone.

6. The method as claimed in claim 1, wherein the carbon nanotube solution further includes a surfactant.

7. The method as claimed in claim 6, wherein the surfactant is selected from the group consisting of sulfated alcohol, alkylsulfonate, α-olefinsulfonate, quaternary ammonium salt, polyoxyethylene, and alcohol ethoxylate.

8. The method as claimed in claim 7, the surfactant is selected from the group consisting of sodium salt of $C_4$-$C_{18}$ straight-alkyl sulfonate, potassium salt of $C_4$-$C_{18}$ straight-alkyl sulfonate, sodium salt of $C_4$-$C_{18}$ straight-alkyl sulfate, potassium salt of $C_4$-$C_{18}$ straight-alkyl sulfate, sodium salt of $C_4$-$C_{18}$ straight-alkyl benzene sulfonate, potassium salt of $C_4$-$C_{18}$ straight-alkyl benzene sulfonate, sodium salt of $C_4$-$C_{18}$ straight-alkyl benzene sulfate, potassium salt of $C_4$-$C_{18}$ straight-alkyl benzene sulfate, $C_2$-$C_{16}$ straight-alkyl quarternary ammonium salt, α-olefin sulfonate, and polyoxyethylene $C_2$-$C_{16}$ alkyl ether.

9. The method as claimed in claim 8, the surfactant is sodium dodecyl sulfonate.

10. The method as claimed in claim 6, wherein the carbon nanotube solution further includes a solvent and contains 1 part by weight of the surfactant, 1 part by weight of the carbon nanotube component, and 1,000-1,000,000 parts by weight of the solvent.

11. The method as claimed in claim 6, further comprising a step of removing residual surfactant from the conductive film of carbon nanotubes.

12. The method as claimed in claim 1, wherein the first transparent flexible material is selected from the group consisting of polyvinyl alcohol, polyacrylic acid, polyethylene glycol, polymethyl methacrylate, and polycarbonate.

13. The method as claimed in claim 1, further comprising a step of spin coating a second transparent flexible material to form a coating layer of the second transparent flexible material on the conductive film of carbon nanotubes after the step e).

14. The method as claimed in claim 13, wherein the second transparent flexible material is selected from the group consisting of polyvinyl alcohol, polyacrylic acid, polyethylene glycol, polymethyl methacrylate, and polycarbonate.

15. The method as claimed in claim 14, further comprising a step of hot pressing the coating layer of the second transparent flexible material, the conductive film of carbon nanotubes, and the coating layer of the first transparent flexible material against the substrate.

16. The method as claimed in claim 1, wherein the step c) is conducted at a supersonic atomizing frequency ranging from 20 KHz to 2.45 MHz.

17. The method as claimed in claim 1, wherein the step e) is conducted by conducting a wet spin coating one time, an initial-cast spin coating one time, and a final-cast spin coating at least one time, wherein the final-cast spin coating is carried out at a low spinning speed, a medium spinning speed, and a high spinning speed.

18. The method as claimed in claim 17, wherein the ratio of the low, medium, and high spinning speeds is 2-3:3-6:8-40.

19. The method as claimed in claim 1, further comprising a step of homogeneously dispersing the carbon nanotube solution prior to the step c).

* * * * *